United States Patent [19]

Falgèn et al.

[11] Patent Number: 5,523,072
[45] Date of Patent: Jun. 4, 1996

[54] PROCESS OF PRODUCING CHLORINE DIOXIDE

[75] Inventors: Helena Falgèn; Göran Sundström; Johan Landfors, all of Sundsvall; Maria Norell, Hovås; Roy Hammer-Olsen, Sundsvall, all of Sweden

[73] Assignee: Eka Nobel Inc., Marietta, Ga.

[21] Appl. No.: 329,099

[22] Filed: Oct. 25, 1994

[30] Foreign Application Priority Data

Aug. 26, 1994 [SE] Sweden ................................. 9402856

[51] Int. Cl.⁶ ...................................................... C01B 11/02
[52] U.S. Cl. .......................... 423/478; 204/520; 205/556
[58] Field of Search .......................... 423/478; 204/182.4, 204/103, 180.1

[56] References Cited

U.S. PATENT DOCUMENTS

| | | | |
|---|---|---|---|
| 2,332,181 | 10/1943 | Soule | 423/478 |
| 2,833,624 | 5/1958 | Sprauer | 423/478 |
| 3,341,288 | 9/1967 | Partridge et al. | 423/478 |
| 3,563,702 | 2/1971 | de Vere Partridge et al. | 423/478 |
| 3,760,065 | 9/1973 | Rapson | 423/478 |
| 3,810,969 | 5/1974 | Schlumberger | 423/478 |
| 4,086,328 | 4/1978 | Swindells | 423/478 |
| 4,129,484 | 12/1978 | Larsson | 204/101 |
| 4,325,934 | 4/1982 | Swindels et al. | 423/478 |
| 4,465,658 | 8/1984 | Fredette | 423/478 |
| 4,683,039 | 7/1987 | Twardowski et al. | 204/95 |
| 4,798,715 | 1/1989 | Hardee et al. | 423/478 |
| 4,806,215 | 2/1989 | Twardowski | 204/98 |
| 4,915,927 | 4/1990 | Lipsztajn et al. | 423/472 |
| 5,084,148 | 1/1992 | Kazcur et al. | 204/95 |
| 5,091,166 | 2/1992 | Engstrom et al. | 423/478 |
| 5,091,167 | 2/1992 | Engstrom et al. | 423/478 |
| 5,106,465 | 4/1992 | Kaczur et al. | 204/98 |
| 5,108,560 | 4/1992 | Cawlfield et al. | 204/103 |
| 5,116,595 | 5/1992 | Scribner et al. | 423/477 |
| 5,122,240 | 6/1992 | Cowley et al. | 204/101 |
| 5,174,868 | 12/1992 | Lipsztajn et al. | 204/95 |
| 5,198,080 | 3/1993 | Cowley et al. | 204/101 |

FOREIGN PATENT DOCUMENTS

| | | |
|---|---|---|
| 0473559 | 3/1992 | European Pat. Off. . |
| 0473560 | 3/1992 | European Pat. Off. . |
| 0532188 | 3/1993 | European Pat. Off. . |
| 3-115102 | 5/1991 | Japan . |
| WO90/10733 | 9/1990 | WIPO . |
| WO91/12356 | 8/1991 | WIPO . |
| WO92/03374 | 3/1992 | WIPO . |

OTHER PUBLICATIONS

Jörissen et al., "The Behvaiour of Ion Exchange Membranes in Electrolysis" and.

*Primary Examiner*—John Niebling
*Assistant Examiner*—Brendan Mee
*Attorney, Agent, or Firm*—Leydig, Voit & Mayer

[57] ABSTRACT

Disclosed is a process of producing chlorine dioxide having the steps of providing a reactor with an aqueous acidic reaction medium containing alkali metal chlorate and phosphate; reducing chlorate ions in the reaction medium to form chlorine dioxide; withdrawing chlorine dioxide gas from the reaction medium; withdrawing reaction medium from the reactor and transferring it to an electrochemical cell; treating the reaction medium electrochemically to increase the acidity and decrease the content of alkali metal ions; recycling the acidified reaction medium to the reactor; and adding make up alkali metal chlorate to the reaction medium before or after the electrochemical cell.

8 Claims, 2 Drawing Sheets

PROCESS OF PRODUCING CHLORINE DIOXIDE

BACKGROUND OF THE INVENTION

The present invention relates to a process of producing chlorine dioxide. The process comprises reducing chlorate in an acidic reaction medium and circulating generator solution containing phosphate between a chlorine dioxide generator and an electrochemical cell.

Chlorine dioxide used in aqueous solution is of considerable commercial interest, mainly in pulp bleaching, but also in water purification, fat bleaching, removal of phenols from industrial wastes etc. It is therefore desirable to provide processes in which chlorine dioxide can be efficiently produced.

There are numerous different processes for chlorine dioxide production. Most processes in commercial use involve reaction of sodium chlorate in an acidic medium with a reducing agent such as hydrogen peroxide, methanol, chloride ions or sulfur dioxide. The acidity is generally provided by sulfuric acid. A drawback of the known processes is the formation of some form of sodium sulfate as a by-product which has to be removed from the reactor, either in the form of a solid saltcake or as waste acid. Most modern processes are operated under subatmospheric pressure, involving precipitation of the sodium sulfate as a saltcake which has to be removed from the reactor by filtering. Today it is hard to find any use for the salt cake and it is normally regarded as an unwanted by-product.

In order to avoid formation of a sulfate by-product, it has been disclosed to provide all acid needed for the chlorine dioxide generation from chloric acid which can be prepared electrochemically from sodium chlorate. Such methods are described in, for example, U.S. Pat. Nos. 4,915,927, 5,084,148 and 5,174,868. However, it has been found difficult to achieve satisfactory current efficiency in production of strong chloric acid which is desirable in order provide efficient chlorine dioxide generation.

U.S. Pat. No. 4,806,215 discloses a process in which chlorine dioxide is generated from sodium chlorate and hydrochloric acid, in which process the generator liquor is acidified electrochemically and recycled back to the reactor. However, this process necessarily results in co-formation of chlorine which cannot be accepted in modern environmental friendly bleaching processes.

U.S. Pat. No. 4,129,484 discloses a process of producing chlorine dioxide in which process sulfuric acid and sodium hydrogen sulfate is withdrawn from the reactor and subjected to electrolysis. However, the current efficiency obtained in the electrochemical cell is not satisfactory.

U.S. Pat. Nos. 5,198,080 and 5,122,240 disclose a process of producing chlorine dioxide involving crystallization and withdrawal of solid sodium sesquisulfate and optionally sodium chlorate. The solid salt is dissolved again, electrolytically acidified and recycled to the chlorine dioxide reactor. Since the process involves handling of solid material it is fairly complicated. Further, the sulfate solution obtained by dissolving the solid sesquisulfate is fairly diluted.

SUMMARY OF THE INVENTION

The object of the present invention is to provide an efficient process of producing chlorine dioxide without formation of undesired by-products, particularly alkali metal sulfate. It is another object to provide a process in which valuable by-products are formed, particularly alkali metal hydroxide, but also hydrogen gas and oxygen gas.

The present invention concerns a process of producing chlorine dioxide comprising the steps: Providing a reactor with an aqueous acidic reaction medium containing alkali metal chlorate and phosphate; reducing chlorate ions in said reaction medium to form chlorine dioxide; withdrawing chlorine dioxide gas from the reaction medium; withdrawing reaction medium from the reactor and transferring it to an electrochemical cell; treating said reaction medium electrochemically to increase the acidity and decrease the content of alkali metal ions; recycling the acidified reaction medium to the reactor; and adding make up alkali metal chlorate to the reaction medium before or after the electrochemical cell.

The phosphate may be in the form of $PO_4^{3-}$, $HPO_4^{2-}$, or $H_2PO_4^-$, all of which are referred to as phosphate ions. The alkali metal could be any alkali metal such as sodium or potassium. Normally, sodium is preferred.

BRIEF DESCRIPTION OF THE DRAWINGS

For a full understanding of the invention, the following detailed description should be read in conjunction with the drawings, wherein.

DETAILED DESCRIPTION OF THE PREFERRED EMBODIMENTS

Figure 1:
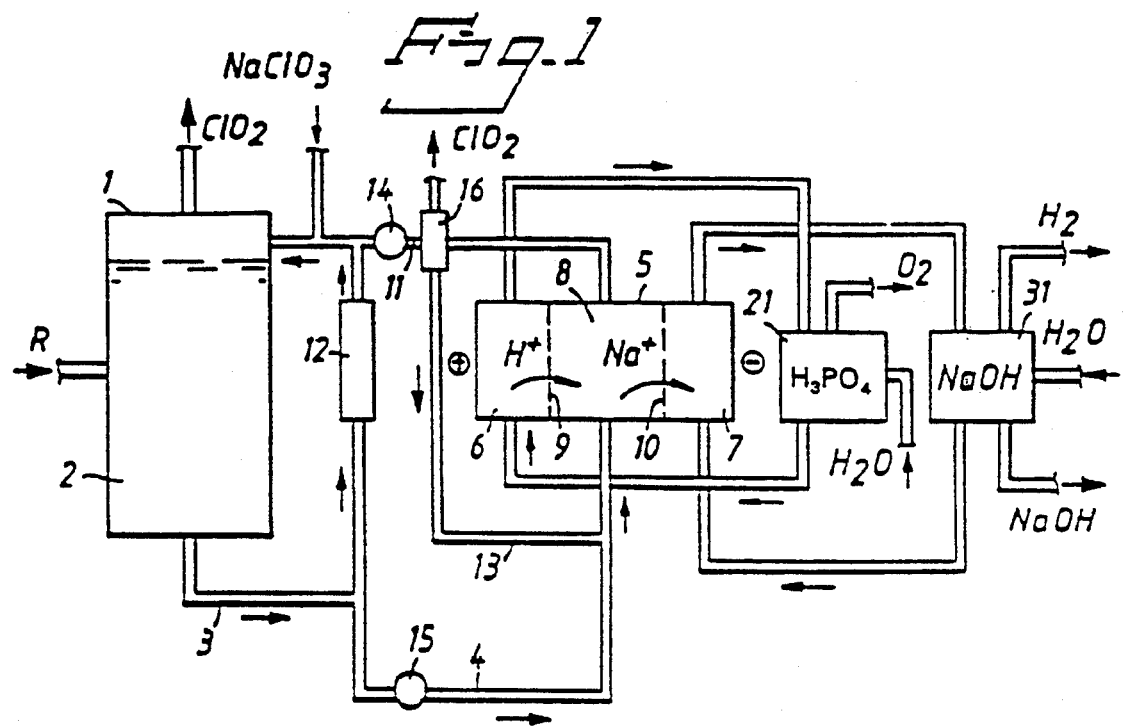
FIG. 1 is a schematic drawing of one embodiment of the invention employing a three chamber electrochemical cell.

It is preferred that the process is performed substantially without crystallization of any alkali metal salt. Then the reaction medium leaving the chlorine dioxide reactor has substantially the same composition as it has within the reactor. The reactor for generation of chlorine dioxide can be of any known type, such as SVP®, (Single Vessel Process) Mathieson and others, the reactor however preferably being operated without crystallization.

It has been found that the current efficiency during the electrolysis increases with the phosphate content of the reaction medium. The phosphate content should be below saturation but preferably exceed about 1.5 moles/liter, most preferably exceeding about 2.5 moles/liter.

It has also been found that the current efficiency during the electrolysis increases with decreasing molar ratio $H^+:PO_4^{3-}$, but on the other hand, it has also been found that the production rate of chlorine dioxide decreases with decreasing molar ratio $H^+:PO_4^{3-}$. In order to obtain high efficiency both for the chlorine dioxide generation and the electrochemical acidification, it has been found that the optimal molar ratio $H^+:PO_4^{3-}$ suitably is from about 1.9 to about 3.1, preferably from about 2.3 to about 3. The preferred acidity in the reaction medium is from about 2 to about 30 N, most preferably from about 5 to about 25 N. The acidity, as well as the content of $H^+$, is defined as all protons that theoretically can be released from the acids in the reaction medium, 1 mole/liter of phosphoric acid thus giving an acidity of 3 N, even if all the protons of the phosphoric acid in reality normally are not free.

In the reactor, the chlorate ions can be reduced by a reducing agent which is most preferred, but also electrochemical reduction is possible. Suitably, a reducing agent is added to the reaction medium, which reducing agent can be selected from organic substances such as methanol, ethanol, isopropanol, other alcohols or formaldehyde, or from inorganic substances such as hydrogen peroxide or chloride ions. Also mixtures of different reducing agents can be used. Methanol is the most preferred reducing agent since it offers the possibility of efficiently producing chlorine dioxide substantially without formation of chlorine. The chlorate concentration can vary within wide limits, suitably from about 1 mole/liter to saturation, preferably from about 2 moles/liter to saturation.

The chlorine dioxide producing reactions are enhanced by the addition of small amounts of catalysts to the reactor. Preferred catalysts belong to the groups VB–VIII, IB, IVA and VIIA of the Periodic Table of the elements. High activity can be achieved by compounds containing V, Nb, Cr, Mn, Fe, Ru, Os, Ni, Pd, Pt, Cu, Ag, Ge, Sn, Pb, Br, and I, either separate or in combinations.

Although not necessary, it is possible to add small amounts of chloride ions, preferably in the form of alkali metal chloride, so as to maintain the concentration thereof in the reaction medium within the range from about 0.001 up to about 0.8 moles/liter.

Although chlorine dioxide generation under atmospheric pressure is possible, it is advantageous if the reaction medium is maintained under subatmospheric pressure in the reactor, enabling higher concentration of chlorine dioxide without risk for explosion and also improving the yield. However, contrary to conventional subatmospheric processes for chlorine dioxide production, it is preferred that no alkali metal salt is crystallized. Suitably, the absolute pressure is maintained from about 60 to about 600 mm Hg, preferably from about 60 to about 400 mm Hg, most preferably from about 75 to about 350 mm Hg. However, it is preferred to operate the electrochemical cell at atmospheric pressure, since pressure fluctuations in the different chambers may damage the membranes.

The temperature in the electrochemical cell is preferably maintained at substantially the same temperature as in the reactor.

Any suitable electrochemical cell enabling acidification of the reaction medium can be used. Normally, a cell comprising an anode compartment and a cathode compartment divided by at least one ion selective membrane is preferred. In addition to an anode- and a cathode compartment, such a cell may comprise one or several compartments in the middle. Any standard type of electrodes can be used. For instance, the anode can be DSA $O_2$™ and the cathode can be Ni. DSA $O_2$ is a dimention stable electrode coated with a catalytic layer of precious metals or precious metal oxides which favors formation of $O_2$. Also gas electrodes such as Hydrina™ can be used. Hydrina™ is an electrochemical cell using hydrogen gas as the anode. Further, standard polymeric ion-exchange membranes can be used, but also high ion conducting membranes such as ceramic membranes can be useful.

In one preferred embodiment, the reaction medium to be acidified is supplied to the middle compartment of a three chamber cell comprising two cation-exchange membranes. Preferably, water or an aqueous solution containing phosphoric acid is supplied to the anode compartment and water or an aqueous solution containing alkali metal hydroxide is supplied to the cathode compartment. In such a cell, hydrogen ions are generated in the anode compartment and passed through the membrane into the middle compartment replacing alkali metal ions passed into the cathode compartment. In the anode compartment oxygen gas is produced, while hydrogen gas and hydroxide ions are produced in the cathode compartment. The advantage of this embodiment is that substances that may be present in the reaction medium, such as chlorate, chloride ions and methanol, are not so easily oxidized on the anode, thus avoiding formation of perchlorate, chlorine and formic acid. Further, the life-time of the anode is increased.

It is also possible to perform the electrolysis in electrochemical cells known per se, for example from the already mentioned U.S. Pat. No. 4,129,484. Thus, it is possible to use a three chamber cell in which the middle compartment is defined by an anion exchange membrane and a cation exchange membrane, entering the reaction medium into the middle compartment, passing chlorate ions and phosphate ions through an anion-exchange membrane into the anode compartment, and withdrawing acidified reaction medium therefrom. Further, a two chamber cell divided by an cation-exchange membrane could be used, acidifying the reaction medium in the anode compartment and passing alkali metal ions through the cation-exchange membrane into the cathode compartment. In these cases, it is also possible to produce alkali metal hydroxide, hydrogen gas and oxygen gas as valuable by-products. It is also possible to use a two chamber cell divided by an anion-exchange membrane. One advantage of using a two chamber cell is that the investment costs are lower.

As earlier mentioned, high acidity in the chlorine dioxide reactor enhances the production rate. On the other hand, high acidity in the electrochemical cell causes the current efficiency to decrease. In order to achieve both effective chlorine dioxide production and high current efficiency, a preferred embodiment of the invention comprises the steps of: recirculating reaction medium from the reactor in a first circulation loop, preferably comprising a heater; withdrawing a portion of the reaction medium from the first loop and transferring it to a second circulation loop comprising the electrochemical cell; and withdrawing a portion of the medium from the second loop and transferring it to the first loop. Since the medium is acidified in the electrochemical cell, while acid is consumed in the chlorine dioxide reactor, the acidity in the second loop is normally slightly higher than in the first loop. However, the difference in acidity in the two loops should preferably be as low as possible, suitably less than about 0.5N, preferably less than about 0.3N, most preferably less than about 0.1N. It is fully possible to operate the system with substantially the same acidity in the two loops at steady state.

The method according to the invention can be performed substantially without removing any chlorate or phosphate from the system. Substantially all chlorate supplied is transformed to chlorine dioxide, i.e. the main product. The alkali metal supplied can be withdrawn from the system as alkali metal hydroxide, a valuable by-product. Phosphate is neither added nor withdrawn, but is circulating as a dead load, improving the efficiency of the electrochemical acidification of the reaction medium. Thus, it has been found possible to provide a method of producing chlorine dioxide from alkali metal chlorate without formation of by-products other than valuable substances such as alkali metal hydroxide, hydrogen gas and oxygen gas. Moreover, when no alkali metal salts are crystallized, there is no need for a filter for removing any salt cake which saves a considerable amount of investment costs. Further, it is easy to make the process work continuously at steady state. Another advantage of the invention, is that only a small amount of water has to be added to the system, thus decreasing the amount that has to be heated and withdrawn by evaporation. Normally, water is only added to the system as a solvent for the make up alkali metal chlorate and the reducing agent. Furthermore, each alkali metal ion passing the membrane in the electrochemical cell, brings a couple of water molecules, thus further decreasing the amount of water to be evaporated.

Figure 2:
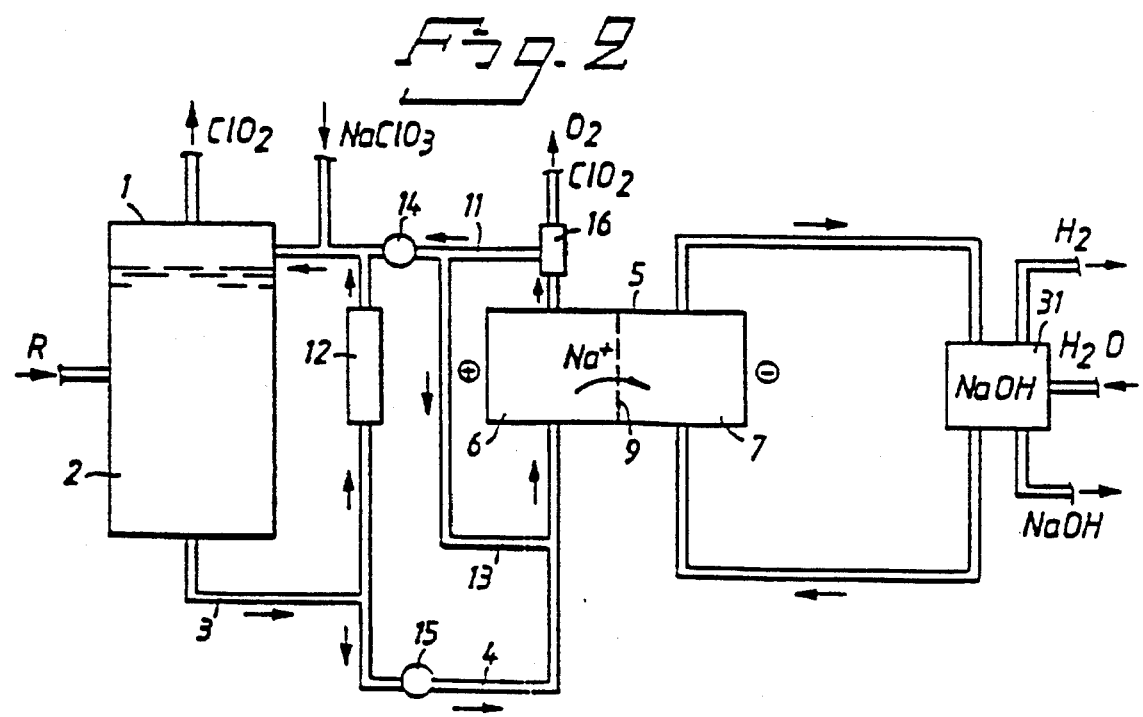
FIG. 2 is another embodiment of the invention employing a two chamber electrochemical cell.
Figure 3:
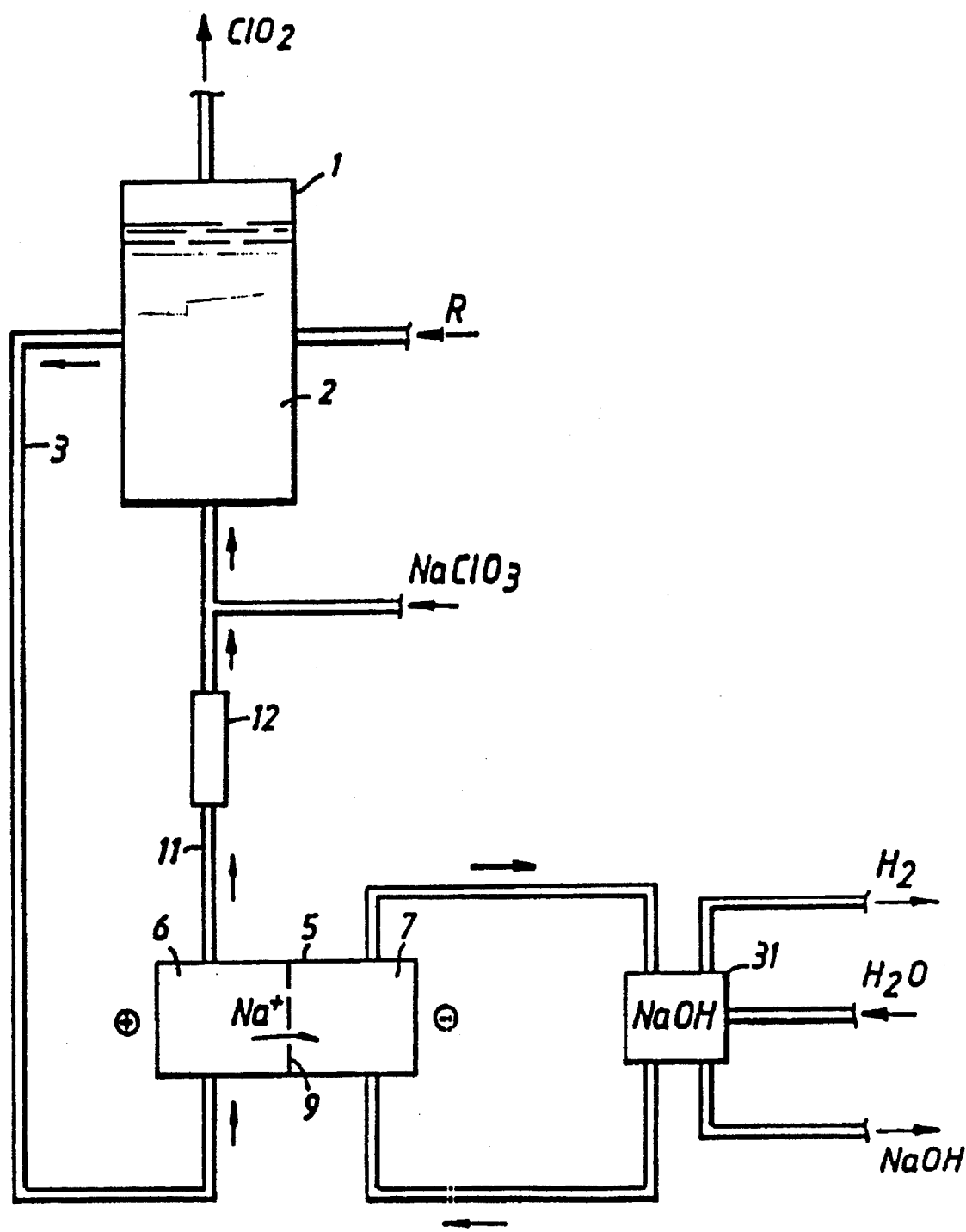
FIG. 3 is a third embodiment of the invention employing a two chamber electrochemical cell in which the reaction medium withdrawn from the reactor passes through the anode compartment of the cell.

The invention will now be described more in detail with reference to the drawings. The FIGS. 1, 2 and 3 schematically show three different embodiments of the invention. The invention is, however, not restricted to what is described below, and it is apparent to those skilled in the art that many other embodiments can be employed within the scope of the claims.

Referring to FIG. 1, a preferred system for producing chlorine dioxide comprises an SVP®-reactor 1 containing an aqueous reaction medium 2. In the reaction medium 2, chlorate ions, phosphate ions, hydrogen ions and sodium ions are present. A reducing agent R, preferably methanol, is supplied to the reaction medium while chlorine dioxide generated in the reaction medium 2 is withdrawn as a gas together with evaporated water diluting the chlorine dioxide to a safe concentration. The withdrawn gas is preferably transferred to a condenser (not shown) in which some of the water is condensed and then to an absorber (not shown) in which the chlorine dioxide is dissolved in water. In order to avoid reaching the explosion limit of chlorine dioxide, an inert gas is often added before the condenser.

In the reactor 1, the absolute pressure is preferably from about 75 to about 400 mm Hg and the temperature is preferably from about 50° to about 85° C. The reaction medium 2 preferably contains from about 2 to about 5 moles/liter of chlorate, from about 1.5 to about 10 moles/liter of phosphate, from about 0.2 to about 8 moles/liter of sodium, and has an acidity from about 8 to about 20N.

The reaction medium 2 is continuously circulating through line 3 and a heater 12. Part of the circulating reaction medium is withdrawn from line 3 to line 4 and transferred to the central compartment 8 of a three chamber cell 5 comprising two cation-exchange membranes 9, 10. In the cell 5, the anode compartment 6 is supplied with phosphoric acid from a tank 21 and the cathode compartment 7 is supplied with sodium hydroxide from a tank 31. In the anode compartment 6, hydrogen ions are generated and passed through the membrane 9 into the central compartment 8. Sodium ions from the reaction medium in the central compartment 7 are passed through the membrane 10 into the cathode compartment. The electrochemical reactions result in acidification of the reaction medium in the central compartment 8, generation of oxygen gas in the anode compartment, and generation of sodium hydroxide and hydrogen gas in the cathode compartment.

As the reaction medium 2 withdrawn from the reactor 1, in addition to chlorate, also normally contains small amounts of unreacted reducing agent, generation of chlorine dioxide will continue in the lines 3, 4 and in the middle compartment 8 of the cell 5. The acidified reaction medium is withdrawn from the middle compartment 8 of the cell 5 and preferably transferred to a gas separator 16 in which chlorine dioxide is withdrawn and preferably mixed with the chlorine dioxide withdrawn from the reactor 1. The mixing of the two chlorine dioxide streams can be performed at any suitable place, for example in the reactor 1, or before or after the condenser (not shown). At least some of the liquid phase from the gas separator 16 is mixed with the reaction medium from the heater 12 and with an aqueous solution of make up sodium chlorate, and then recycled back through line 11 to the reactor 1. A portion of the liquid phase is preferably recycled back to the cell 5 through line 13. Such a system thus comprises two circulation loops for the reaction medium, a first loop including the reactor 1, line 3 and the heater 12, a second loop including the cell 5, the gas separator 16 and line 13. The difference in acidity of the medium in the two loops should preferably be as low as possible. In the tank 21, oxygen is withdrawn and water is added to the anolyte. The electrochemical cell 5 is operated under atmospheric pressure and the connections between the cell 5 and the reactor 1 is therefore provided with means 14, 15 for altering the pressure of the reaction medium, which means 15, 16, for example, can include ordinary pumps. Alternatively, the chlorine dioxide reactor 1 can be placed at a higher level than the cell 5, the pressure thus being altered by the gravity force. In the tank 31, hydrogen and sodium hydroxide are withdrawn and water is added to the catholyte.

Referring to FIG. 2, another preferred embodiment for producing chlorine dioxide is shown. The system is similar to the one shown in FIG. 1, except that the electrochemical cell 5 only consists of two chambers 6, 7 divided by a cation-exchange membrane 9. The chlorine dioxide reactor 1 and the catholyte system 7, 31 are operated as in FIG. 1. The reaction medium to be acidified is transferred through line 4 to the anode compartment 6 of the cell 5, in which compartment 6 hydrogen ions and oxygen gas are generated. Sodium ions are passed through the cation-exchange membrane 9 into the cathode compartment 7 in which hydroxide ions and hydrogen gas are generated. As in the embodiment of FIG. 1 chlorine dioxide generation is normally continued in the lines 3, 4 and in the anode compartment 6 of the cell 5. The acidified reaction medium withdrawn from the anode compartment 6 is preferably transferred to a gas separator 16 in which oxygen and chlorine dioxide gas is withdrawn and mixed with the chlorine dioxide withdrawn from the reactor as in the embodiment of FIG. 1. Since oxygen is also present, the need for addition of an inert gas to the chlorine dioxide is decreased. Further, if the chlorine dioxide is to be used for bleaching, also the oxygen acts as a bleaching agent. The portion of the liquid phase withdrawn from the gas separator 16 not recycled back to the cell 5 through line 13 is transferred to the chlorine dioxide reactor 1 in the same manner as in FIG. 1, implying that also the two circulation loops for the reaction medium work out as in the embodiment of FIG. 1. Accordingly, chlorine dioxide, sodium hydroxide, hydrogen gas and oxygen gas are produced as in the system described in FIG. 1.

Referring to the embodiment of FIG. 3, the chlorine dioxide reactor 1 and the cell 5 work as in FIG. 2. However, the cell 5 should be placed below the reactor 1. Preferably the heater 12 is placed between the cell 5 and the reactor 1. Substantially all the reaction medium withdrawn from the reactor 1 is passed through the anode compartment 6 of the cell 5. Since oxygen gas is generated, the gas lift will create a sufficiently strong pumping effect to circulate the reaction medium without any additional pumps. If only a small amount of gas is generated in the cell 5, for example if a three chamber cell of FIG. 1 is used, inert gas such as air can be added after the cell in order to obtain the desired gas lift. The system is preferably designed with a difference in height between the reactor 1 and the cell 5 so as to balance the subatmospheric pressure in the reactor 1 and the atmospheric pressure in the cell 5 with the gravity force.

We claim:

1. A process of producing chlorine dioxide comprising the steps of providing a reactor with an aqueous acidic reaction medium containing alkali metal chlorate and phosphate; reducing chlorate ions in said reaction medium to form chlorine dioxide substantially without crystallization of any alkali metal salt or reaction of said phosphate; withdrawing chlorine dioxide gas from the reaction medium; withdrawing reaction medium from the reactor and transferring it to an electrochemical cell; treating said reaction medium electrochemically to increase the acidity and decrease the content of alkali metal ions; recycling the acidified reaction medium including said phosphate to the reactor; and adding make up alkali metal chlorate to the reaction medium before or after the electrochemical cell wherein the content of phosphate in the reaction medium exceeds about 1.5 moles/liter.

2. A process as claimed in claim 1, wherein the molar ratio $H^+:PO_4^{3-}$ in the reaction medium is from about 1.9 to about 3.1.

3. A process as claimed in claim 1, wherein the absolute pressure in the chlorine dioxide producing reactor is maintained from about 60 to about 400 mm Hg.

4. A process as claimed in claim 1, wherein a reducing agent is added to the reaction medium.

5. A process as claimed in claim 4, wherein the reducing agent comprises methanol.

6. A process as claimed in claim 1, wherein the process comprises the steps of: recirculating reaction medium from the reactor in a first circulation loop; withdrawing a portion of the reaction medium from the first loop and transferring it to a second circulation loop comprising the electrochemical cell; and withdrawing a portion of the medium from the second loop and transferring it to the first loop.

7. A process as claimed in claim 6, wherein the difference in acidity between the two loops is less than about 0.5N.

8. A process as claimed in claim 1, wherein the process is performed substantially without removing any unreacted chlorate or phosphate from the process.

* * * * *